United States Patent [19]

Taniguchi et al.

[11] Patent Number: 5,056,120
[45] Date of Patent: Oct. 8, 1991

[54] PHASE ADJUSTING CIRCUIT

[75] Inventors: Atsuki Taniguchi, Kawasaki; Nobuhiro Fujimoto, Ebina; Tomohiro Ishihara, Hachioji; Takaaki Wakisaka, Kawasaki, all of Japan

[73] Assignee: Fujitsu Limited, Kawasaki, Japan

[21] Appl. No.: 381,389

[22] Filed: Jul. 18, 1989

[30] Foreign Application Priority Data

Jul. 18, 1988 [JP] Japan .................. 63-178380

[51] Int. Cl.$^5$ ............................................. H04L 7/00
[52] U.S. Cl. ..................................... 375/118; 307/510; 328/72
[58] Field of Search .................. 375/95, 106, 111, 113, 375/118, 119; 328/63, 72, 75; 331/1 A, 1 R; 307/510, 511

[56] References Cited

U.S. PATENT DOCUMENTS

| 3,959,589 | 5/1976 | von Roesgen | 375/118 |
|---|---|---|---|
| 4,010,323 | 3/1977 | Peck | 375/118 |
| 4,017,803 | 4/1977 | Baker | 375/95 |
| 4,119,796 | 10/1978 | Jones | 375/118 |
| 4,520,408 | 5/1985 | Velasquez | 360/51 |
| 4,672,639 | 6/1987 | Tanabe et al. | 328/75 |
| 4,756,011 | 7/1988 | Cordell | 375/95 |
| 4,805,198 | 2/1989 | Stern et al. | 331/1 A |
| 4,841,551 | 6/1989 | Avaneas | 375/118 |

FOREIGN PATENT DOCUMENTS 64-77241 3/1989 Japan .

Primary Examiner—Stephen Chin
Attorney, Agent, or Firm—Staas & Halsey

[57] ABSTRACT

A phase adjusting circuit for adjusting a phase of each bit of serial data by synchronizing with a system clock. The phase adjusting circuit includes a plurality of registers. Each bit of data is input into a corresponding one of the plurality of registers in a predetermined cyclic order, synchronized with a receiving clock which is extracted from the data, and outputting outputs of the registers in parallel. The outputs are each selected in a selector circuit under a control of the selector control signal in the same order as the above input to the registers. The selector control signal is generated by detecting a phase relationship between phases of the receiving clock and the system clock, and generating a selector control signal having a phase which is determined according to the phase relationship. Then, each bit of the above selected output is synchronized with the system clock.

17 Claims, 11 Drawing Sheets

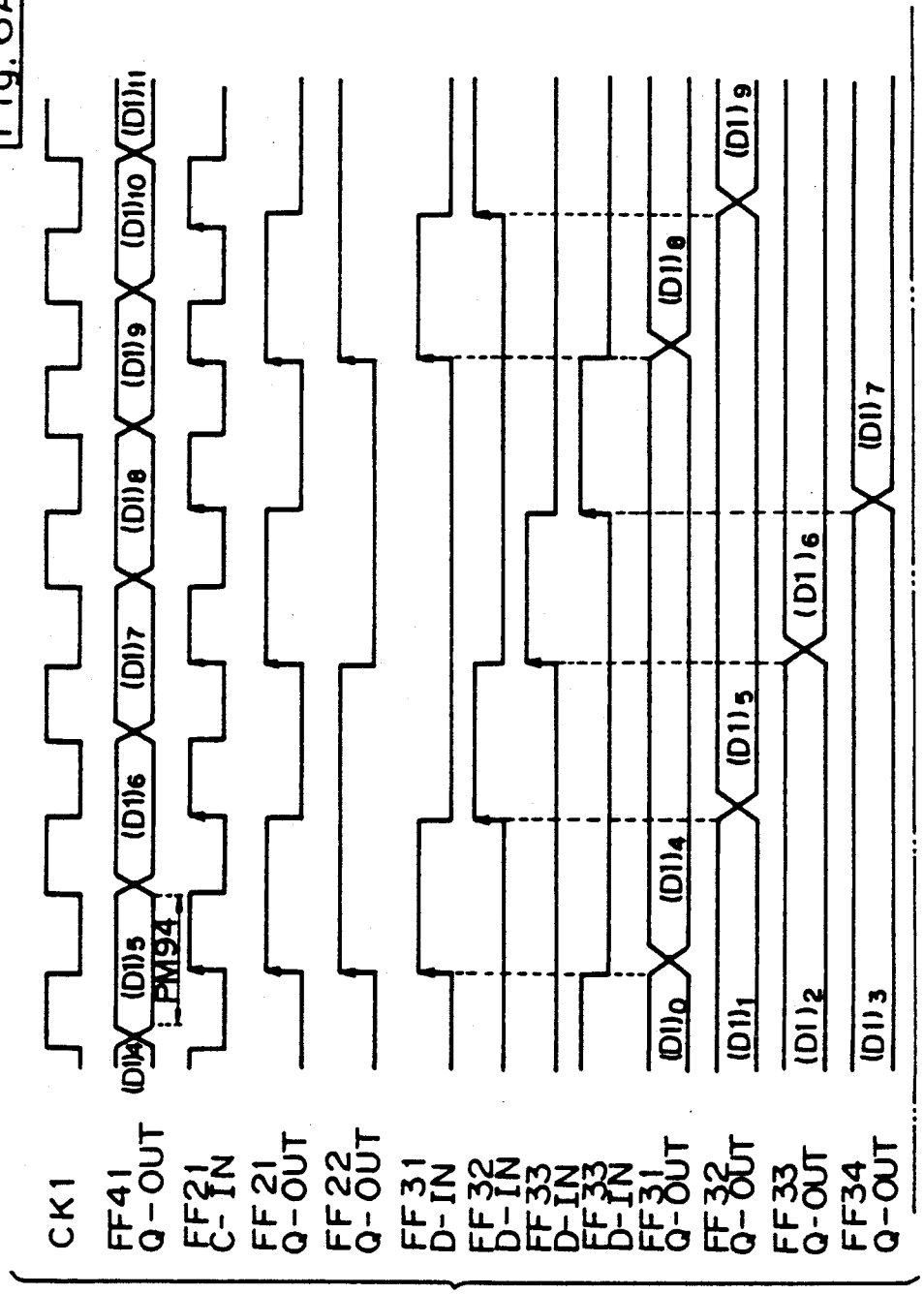

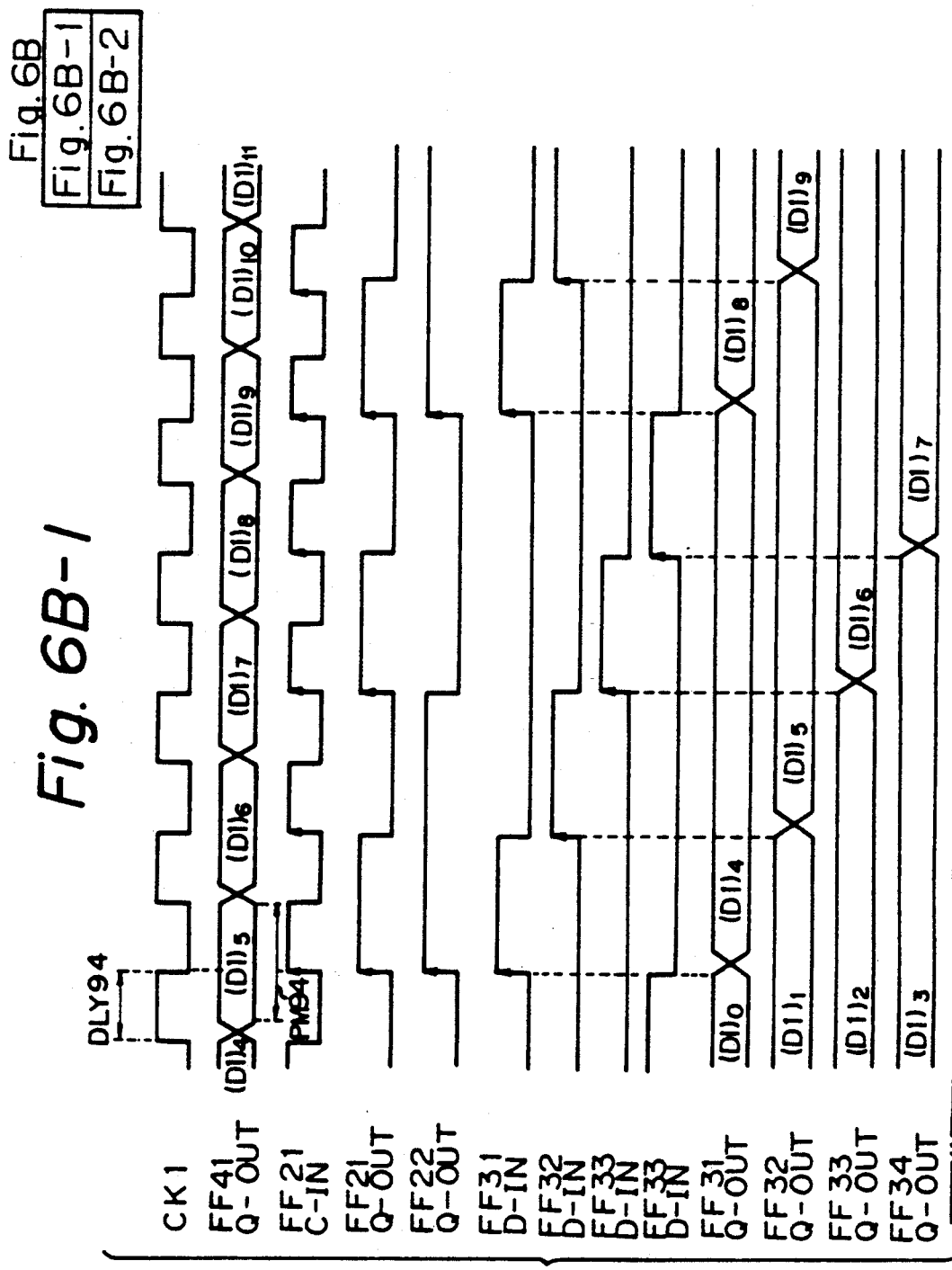

PHASE ADJUSTING CIRCUIT

BACKGROUND OF THE INVENTION

(1) Field of the Invention

The present invention relates to a phase adjusting circuit for adjusting a phase of each bit of serial data by synchronizing with a system clock, in other words, a phase adjusting circuit for converting data synchronized with a first clock to data synchronized with a second clock.

Generally, a data processing system includes a plurality of sub-units for carrying out various kinds of data processing operations, each of the sub-units in the system usually operates synchronized with one or more clocks, and all the clocks are generated from a common master clock. Data processed in each of the sub-units is, therefore, synchronized with the clock in the sub-unit, but, when data output from one sub-unit is transferred to an other sub-unit, a phase difference occurs between data from the two sub-units due to a delay during the transferring operation or the like.

When data is input into a sub-unit, each bit of the data must be first synchronized with a system clock in the sub-unit for being processed in the sub-unit. As a most typical example, in a data multiplexing apparatus, data from a plurality of units must be multiplexed synchronized with a sending clock.

To synchronize data with the system clock, each bit of input data is read at the timing of a rising or falling edge of the system clock by an edge-triggered operation. Since the value of data in each bit is not necessarily stable near the data changing points (timings), i.e., near the beginning time of or the ending time of the duration of a data value of each bit, the above edge-triggered operation is required to be carried out at the time when the data is stable.

In practice, when designing and constructing a circuit for carrying out the above edge-triggered operation, there is an additional difficulty to determine an accurate timing of the edge-triggered operation, due to a small but significant difference in delays occurring in individual circuits. The difference cannot be eliminated because geometries of the circuit arrangement and characteristics of circuit elements used in individual circuits are inevitably somewhat different from each other. Thus, a variation in the timing of the above edge-triggered operation may cause an error when inputting bit data transferred from an other unit.

(2) Description of the Related Art

In the prior art, to synchronize input data with the system clock, each bit of data is first stored in a memory circuit, e.g., an elastic memory, and is then read out at the timing of the system clock. However, the use of the memory circuit for this purpose increases the cost and the scale of the circuitry, and further slows the operation. Therefore, the applicants previously proposed the following construction of a phase adjusting circuit which reduces the cost and the scale of the circuitry, and further quickens the operation.

FIG. 1 shows the construction of the above-mentioned phase adjusting circuit in the prior art for adjusting a phase of each bit of serial data by synchronizing with a system clock, in other words, a phase adjusting circuit for converting data synchronized with a first clock to data synchronized with a second clock, which was provided by the applicants and is disclosed in the Japanese Unexamined Patent Publication NO. 64-77241.

In FIG. 1, reference numerals 51, 52, 53 and 55 each denote a D-type flip-flop circuit, 56 and 57 each denote a delay circuit, and 54 denotes an exclusive NOR circuit. In addition, CK2 denotes a system clock, D1 denotes input data, CK1 denotes a receiving clock which is extracted from the input data D1, and D2 denotes output data the phase of which has been adjusted by the system clock CK2.

The input data D1 is applied to the data input terminal of the D-type flip-flop circuit 51, and the receiving clock CK1 is applied to the edge-triggered input terminal of the D-type flip-flop circuit 51. Therefore, the D-type flip-flop circuit 51 outputs the input data synchronized with the receiving clock CK1, and then the output is applied to the data input terminal of the D-type flip-flop circuit 55.

The above receiving clock CK1 is also input into the delay circuit 56. The output of the delay circuit 56 is applied to the data input terminal of the D-type flip-flop circuit 53 and to one input terminal of the exclusive NOR circuit 54. On the other hand, the system clock CK2 is applied to the edge-triggered input terminal of the D-type flip-flop circuit 53 through the delay circuit 57. Then, the Q-output of the D-type flip-flop circuit 53 is applied to the other input terminal of the exclusive NOR circuit 54. The output of the exclusive NOR circuit 54 is applied to the edge-triggered input terminal of the D-type flip-flop circuit 55. The Q-output of the D-type flip-flop circuit 55 is applied to the data input terminal of the D-type flip-flop circuit 52. The above system clock CK2 is also applied to the edge-triggered input terminal of the D-type flip-flop circuit 52. Thus, the above-mentioned output data D2 is obtained as the the Q-output of the D-type flip-flop circuit 52.

The D-type flip-flop circuit 51 functions as an input buffer register, the D-type flip-flop circuit 52 functions as an output buffer register, and the Q-output of the D-type flip-flop circuit 51 is input into (i.e., is output from) the D-type flip-flop circuit 55 at an intermediate timing between the receiving clock CK1 and the system clock CK2. The timing of the intermediate timing is controlled as follows.

FIGS. 2A and 2B show timings in the operation of the construction of FIG. 1.

As shown in FIGS. 2A and 2B, the clock CK1 is delayed in the delay circuit 56 so that each duration of a low level state lies in the center of a duration of the output of a data bit (although not shown in FIG. 2A, a high level state instead of the low level, may be in the center of the duration of a data bit).

As shown in FIG. 2A, when the output of the delay circuit 57 (which is a delayed system clock CK2) rises while the level of the delay circuit 56 (which is a delayed receiving clock CK1) is high, the Q-output of the D-type flip-flop circuit 53 is at a high level, and therefore, the output of the delay circuit 57 is applied to the edge-triggered input terminal of the D-type flip-flop circuit 55 through the exclusive NOR circuit 54. Therefore, the Q-output of the D-type flip-flop circuit 51 is input into the D-type flip-flop circuit 55 at the timing of rising edge of the output of the exclusive NOR circuit 54. Next, the Q-output of the D-type flip-flop circuit 55 is input into the D-type flip-flop circuit 52 at the timing of the rising edge of the system clock CK2.

As shown in FIG. 2B, when the output of the delay circuit 57 rises while the level of the delay circuit 56

(which is a delayed receiving clock CK1) is low, the Q-output of the D-type flip-flop circuit 53 is at a low level, and therefore, the output of the delay circuit 57 is inverted in the exclusive NOR circuit 54, and is then applied to the edge-triggered input terminal of the D-type flip-flop circuit 55. The Q-output of the D-type flip-flop circuit 51 is input into the D-type flip-flop circuit 55 at the timing of rising edge of the output of the exclusive NOR circuit 54, i.e., at the timing of falling edge of the output of the delay circuit 56. Next, the Q-output of the D-type flip-flop circuit 55 is input into the D-type flip-flop circuit 52 at the timing of the rising edge of the system clock CK2.

In both cases of FIGS. 2A and 2B, i.e., regardless of the phase of the output of the delay circuit 57 (regardless of the phase of the system clock CK2), the timing at which the Q-output of the D-type flip-flop circuit 54 is input into the D-type flip-flop circuit 52 is limited within the range W. Thus, the aforementioned synchronization of input data with the system clock CK2 by reading each bit of data at the timing of an rising or falling edge of the system clock by an edge-triggered operation, is carried out at the timings rather apart from the data changing points of each bit data. The distances from the above range W of the timing of the edge-triggered operation to the data changing points in both sides of the range W, which are defined as phase margins in the construction of FIG. 1, are denoted by PM1 and PM2 in FIGS. 2A and 2B.

The width of the range w is determined by the duration of the level of the delay circuit 56 is low (or high) shown in FIG. 2A and FIG. 2B, i.e., a phase of 180° (a half cycle of the cycle time of the input data, i.e., a half of the duration of one input data bit).

In a typical example wherein the frequency of the input data is 100MHz, the above phase margins PM1 and PM2 are each 2.5 ns.

However, generally, the duty factor of the input data signal (the ratio of the width of the high level signal in a cycle time to the cycle time) varies around the 50%. For example, when the duty cycle is less than 50%, as shown in FIGS. 2A and 2B, the above phase margins PM1 and PM2 are reduced, i.e., the extent of the above-mentioned timing of the edge-triggered operation can approach the data changing points. As mentioned before, this increases in the possibility of an occurrence of an error in reading data for synchronization with the system clock.

Generally, the relative extent of the vicinity of the data changing point in a cycle wherein the value of the data signal is unstable, and the above possibility of an occurrence of an error resulting from the instability, depend on the frequency of the input signal and the response speeds of the elements constituting the circuit. Higher frequency and lower response speed make the relative extent of the instable region in a cycle time larger, and the possibility of an occurrence of an error higher.

SUMMARY OF THE INVENTION

An object of the present invention is to provide a phase adjusting circuit for adjusting a phase of each bit of serial data by synchronizing with a system clock, having a large phase margin regarding the data synchronization with a system clock, and wherein the relative extent of an instable region in the vicinity of the data changing point in a cycle, and the above possibility of an occurrence of an error resulting from the instability, are reduced.

According to the present invention, there is provided a phase adjusting circuit for adjusting a phase of each bit of serial data by synchronizing with a system clock, comprising: a register means having a plurality of registers, for inputting each bit of the data into a corresponding one of the plurality of registers in a predetermined cyclic order, synchronized with a receiving clock which is extracted from the data, and outputting outputs of the registers in parallel, a selector control signal generating means for detecting a phase relationship between phases of the system clock and the receiving clock, and generating a selector control signal having a phase which is determined according to the above phase relationship, a selecting means for selecting one of the outputs of the registers in the order of the above input into the register means, under the control of the selector control signal, and a data outputting means for inputting an output of the selecting means, and serially outputting the received output, synchronized with the system clock.

BRIEF DESCRIPTION OF THE DRAWINGS

In the drawings:

FIGS. 6A and 6B 6A-1, 6A-2, 6B-1, 6B-2 show the timings of an operation of the construction of FIG. 5.

DESCRIPTION OF THE PREFERRED EMBODIMENTS

Before describing the preferred embodiment of the present invention, first, the basic principle of the present invention is explained below.

As mentioned in the summary of the invention, according to the present invention, each bit of serial data is registered in a corresponding one of the plurality of registers in a predetermined cyclic order, and therefore, the content of each register is renewed by a new data bit once in the above predetermined cycle, which is longer than the cycle time of the input data by a factor equal to the number of the plurality of registers, i.e., each bit of the input data is held in a corresponding register for a time which is longer than the cycle time of the input data by the factor equal to the number of the plurality of registers.

This reduces the relative extent of the vicinity of the data changing point in a cycle wherein the value of the data signal is unstable, by elongating the substantial cycle time during which cycle time the aforementioned edge-triggered operation for synchronizing input data with the system clock is carried out.

Then, the data registered in the registers are read out one bit by one bit by being selected in the order of the above input into the registers under the control of the selector control signal, where the selector control signal is obtained by detecting a phase relationship between phases of the system clock and the receiving clock, and determining the phase of the selector control signal according to the phase relationship. Finally, the selected data is synchronized with the system clock, and is then serially output.

In addition, the above phase of the selector control is so determined that each of the outputs of the registers is selected in the selecting means at a duration as near as possible the center of the duration of the output of the register.

Further, the phase of the duration wherein each data bit is selected in the selecting means is adjusted in advance so that the aforementioned edge-triggered operation can be carried out for a stable data value.

Figure 3:
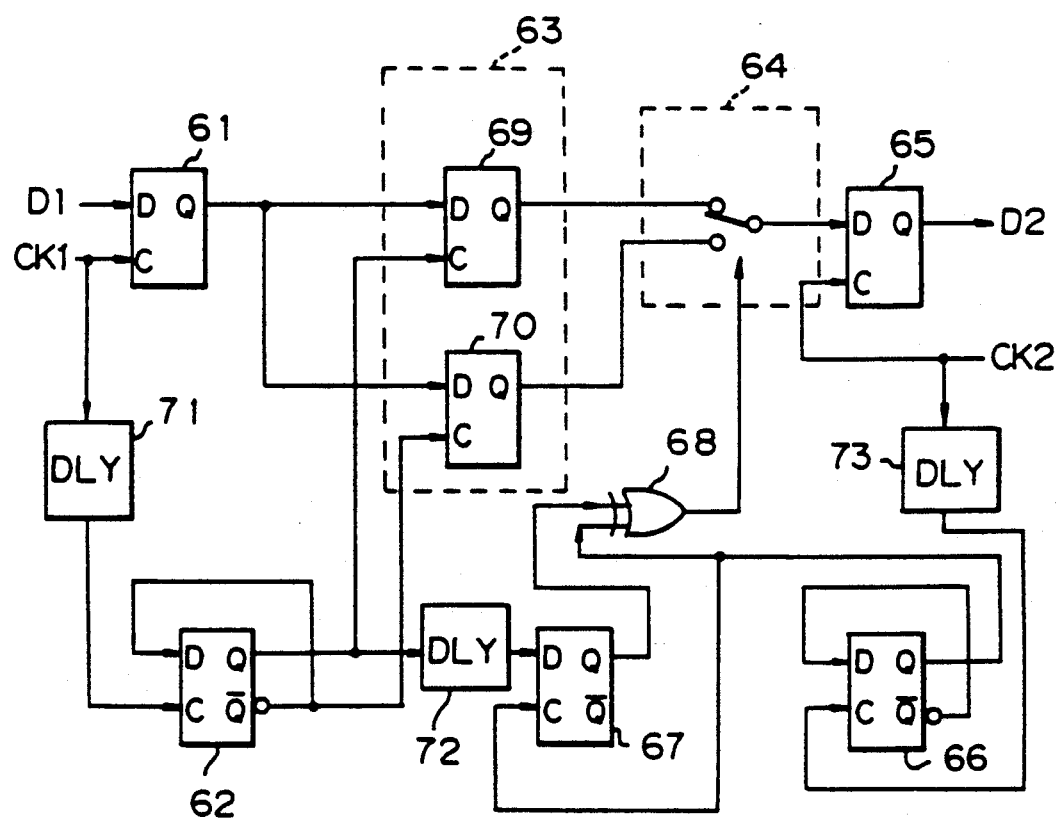
FIG. 3 shows a construction of the first embodiment of the present invention.

FIG. 3 shows a construction of the first embodiment of the present invention.

In FIG. 3, reference numerals 61, 62, 65, 66, 67, 69, and 70 each denote a D-type flip-flop circuit, 64 denotes a selector, 68 denotes an exclusive OR circuit, and 71 and 73 each denote a delay circuit.

Figure 1:
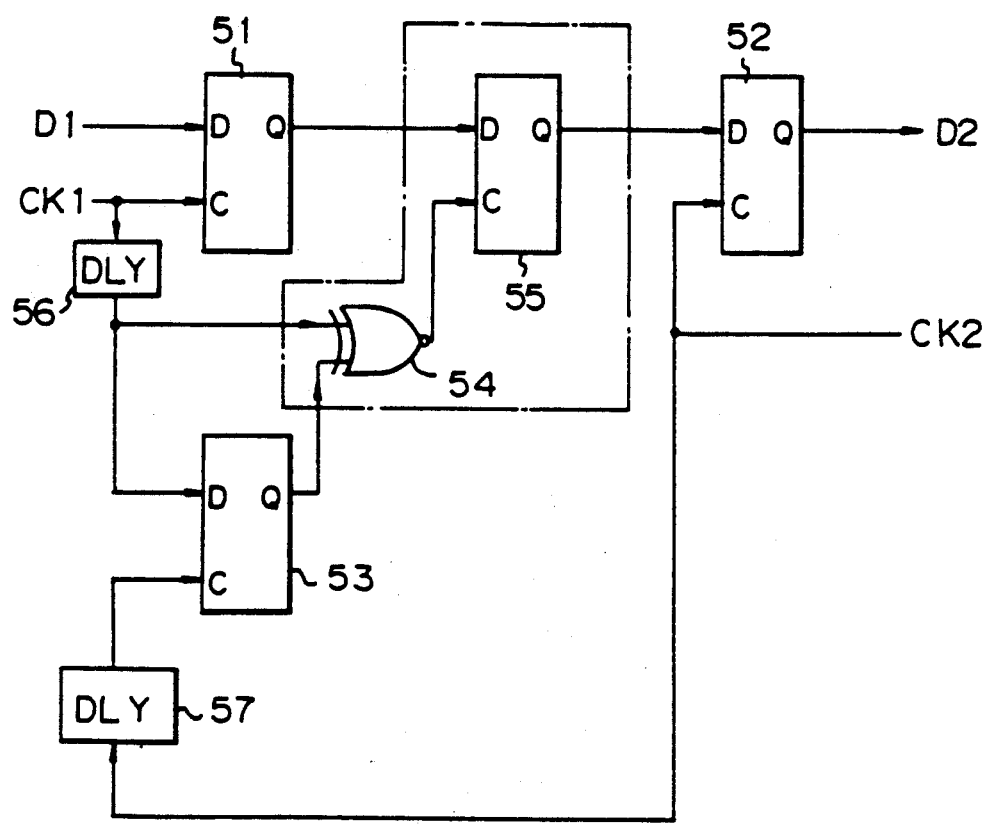
FIG. 1 shows a construction of a phase adjusting circuit for adjusting a phase of each bit of serial data by synchronizing with a system clock in the prior art.
Figure 2A:
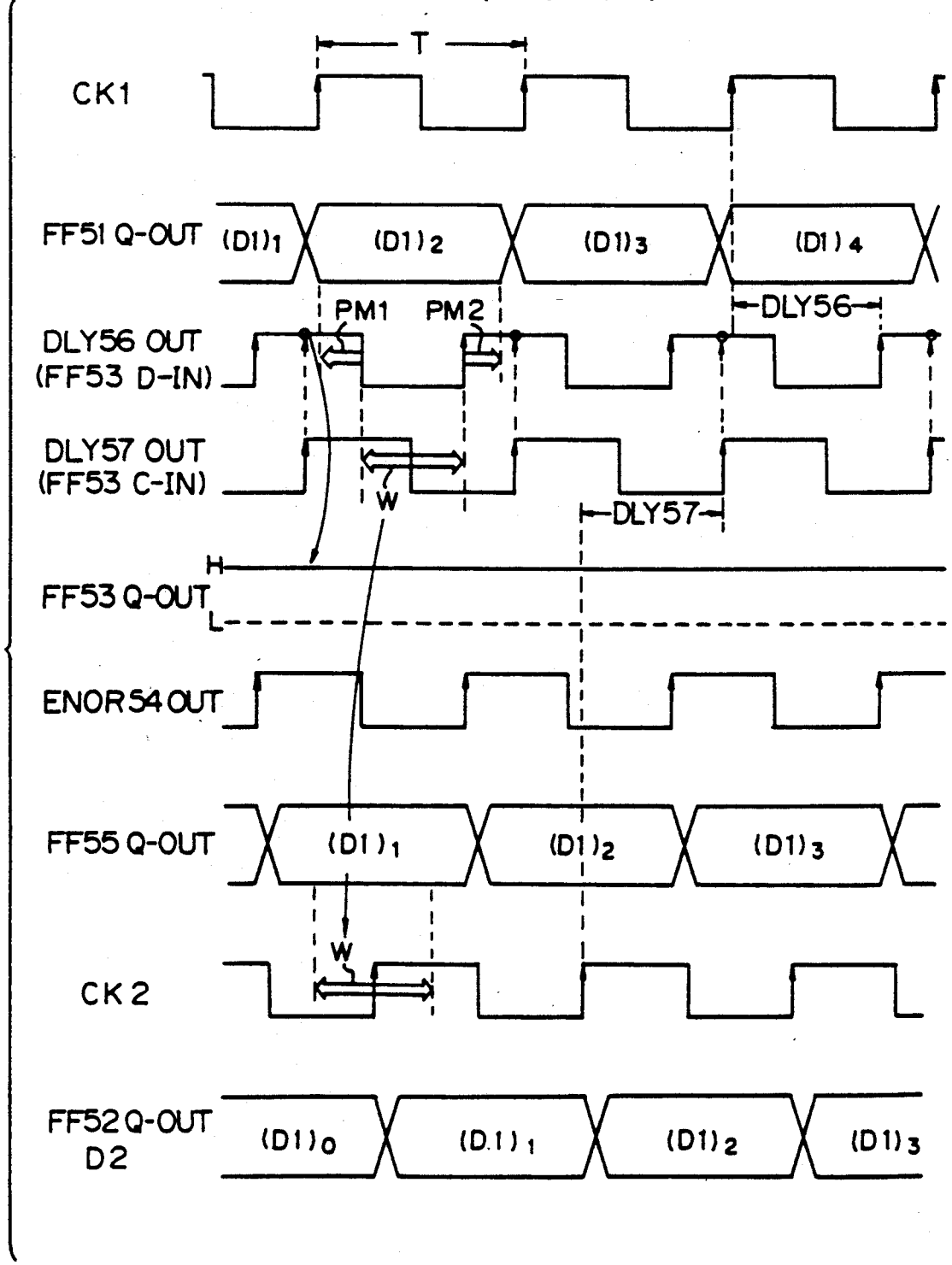
FIGS. 2A and 2B show timings in the operation of the construction of FIG. 1.
Figure 2B:
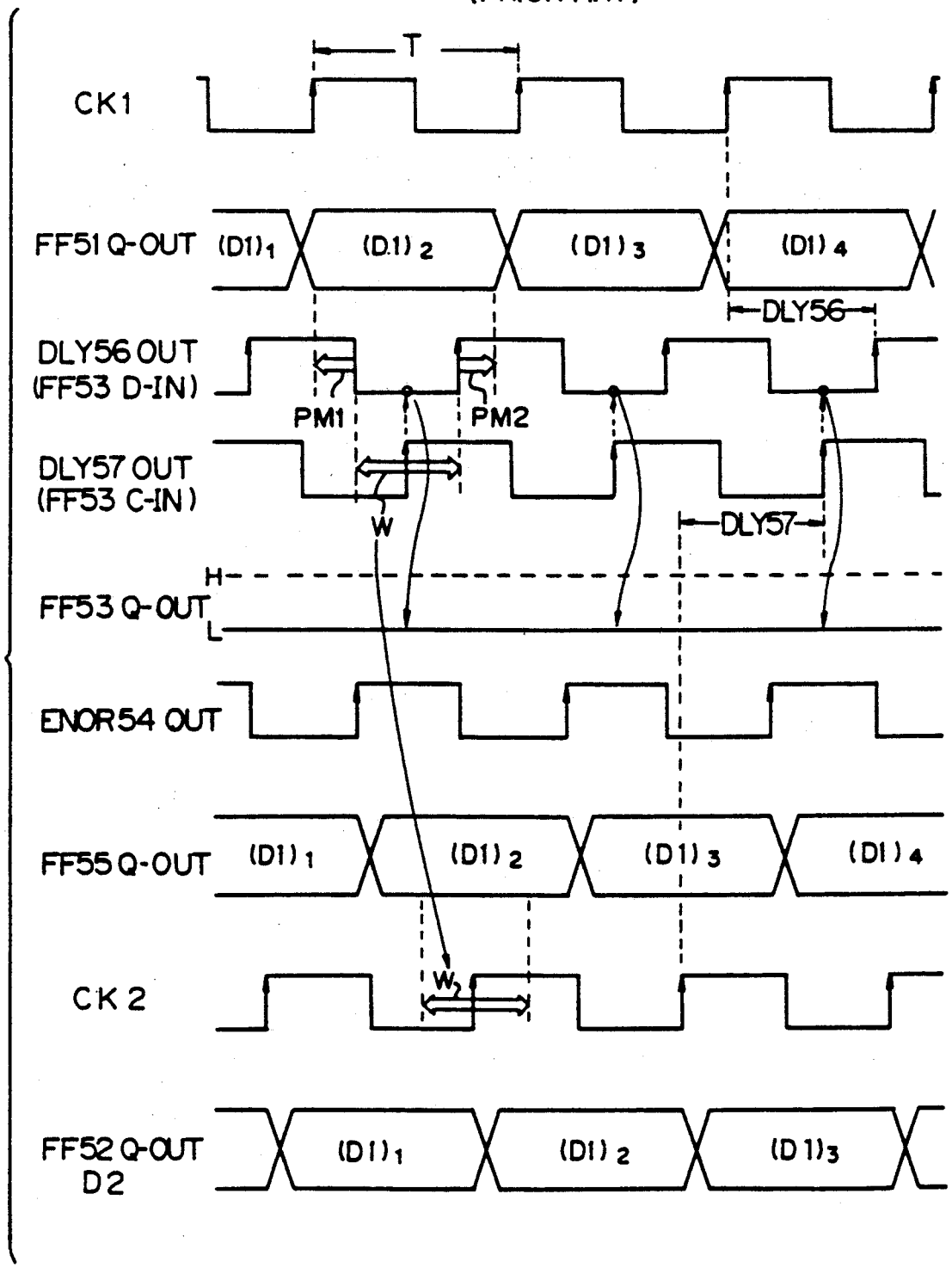

The D-type flip-flop circuit 61 in FIG. 3, which corresponds to the D-type flip-flop circuit 51 in FIG. 1, functions as an input buffer register, and the D-type flip-flop circuit 65 in FIG. 3, which corresponds to the D-type flip-flop circuit 52 in FIG. 1, functions as an output buffer register. Further, the D-type flip-flop circuit 67 and the exclusive OR circuit 68 in FIG. 3, correspond to the D-type flip-flop circuit 53 and the exclusive OR circuit 54 in FIG. 1.

According to the present invention, the Q-output of the D-type flip-flop circuit 61 is input into the D-type flip-flop circuits 69 and 70, alternatively. The D-type flip-flop circuits 69 and 70 constitute the aforementioned register means comprising a plurality of registers.

The timing of the inputs of the above data into the D-type flip-flop circuits 69 and 70 are given by the ½ frequency dividing circuit constructed by the D-type flip-flop circuit 62 which receives the receiving clock CK1 at the edge-triggered input terminal C through the delay circuit 71, and connects its own $\overline{Q}$-output terminal to its own data input terminal. The Q-output of the D-type flip-flop circuit 62 is applied to the edge-triggered input terminal C of the D-type flip-flop circuit 69, and the $\overline{Q}$-output of the D-type flip-flop circuit 62 is applied to the edge-triggered input terminal C of the D-type flip-flop circuit 70.

On the other hand, the system clock CK2 is delayed through the delay circuit 73, and is then applied to the data input terminal of the D-type flip-flop circuit 66. The D-type flip-flop circuit 66 also constitutes a ½ frequency dividing circuit by connecting its own $\overline{Q}$-output terminal to its own data input terminal, and dividing the frequency of the above delayed system clock by ½. The Q-output of the D-type flip-flop circuit 66 is applied to the edge-triggered input terminal of the D-type flip-flop circuit 67 and one of the input terminals of the exclusive OR circuit 68.

The above-mentioned Q-output of the D-type flip-flop circuit 62 is applied to the data input terminal of the D-type flip-flop circuit 67 through the delay circuit 72, and the Q-output of the D-type flip-flop circuit 67 is applied to the other input terminal of the exclusive OR circuit 68. The output of the exclusive OR circuit 68 is supplied to the selector 64 as a control input.

The outputs of the registers 69 and 70 are respectively connected to two input terminals of the selector 64. One of the outputs of the registers 69 and 70 is selected at the selector 64. The output of the selector 64 is applied to the data input terminal of the D-type flip-flop circuit 65 which receives the system clock CK2 at its own edge-triggered input terminal C, and the output of the selector 64 is then input into the D-type flip-flop circuit 65 synchronized with the system clock CK2.

Figure 4A:
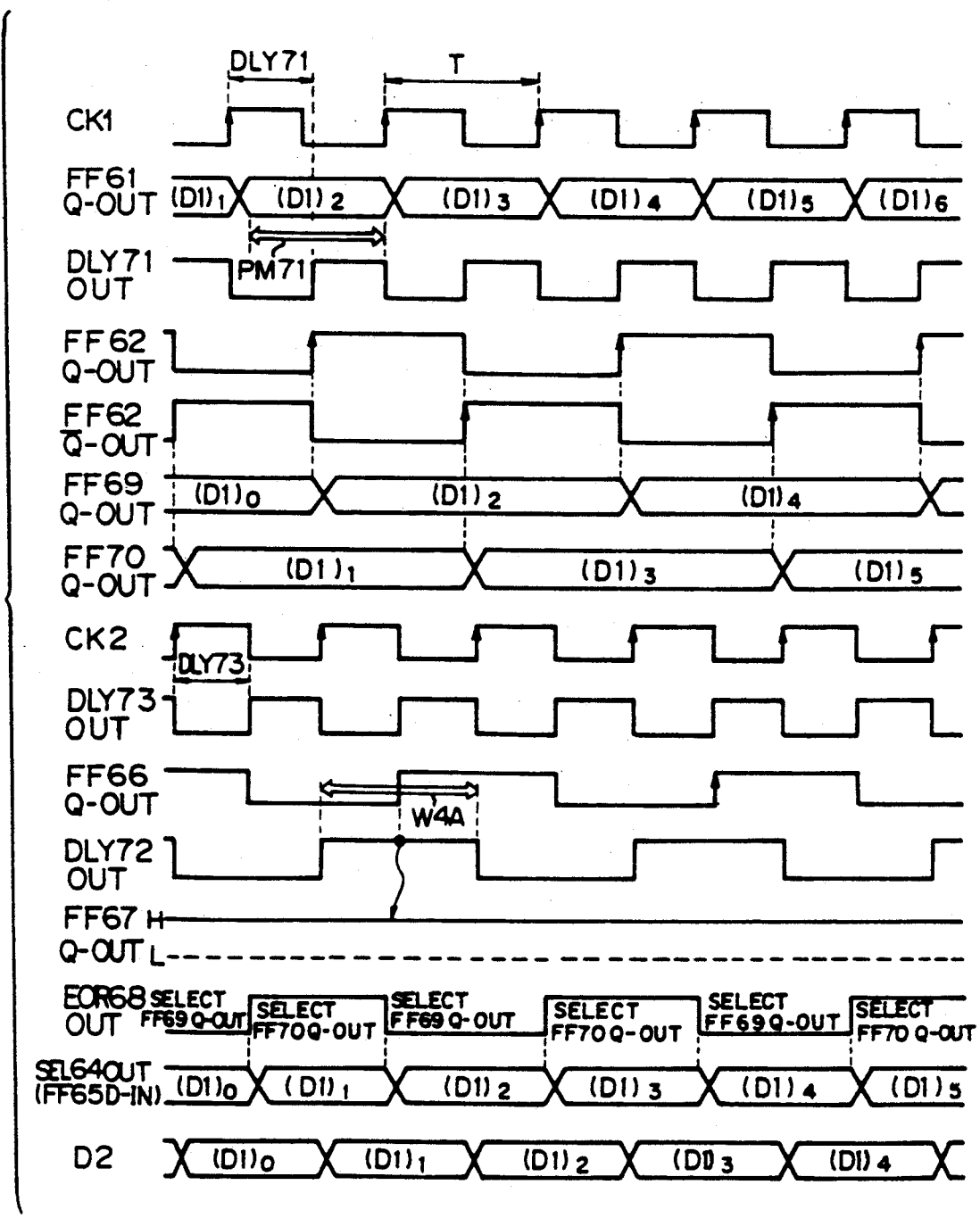
FIGS. 4A and 4B show the timings of an operation of the construction of FIG. 3.
Figure 4B:
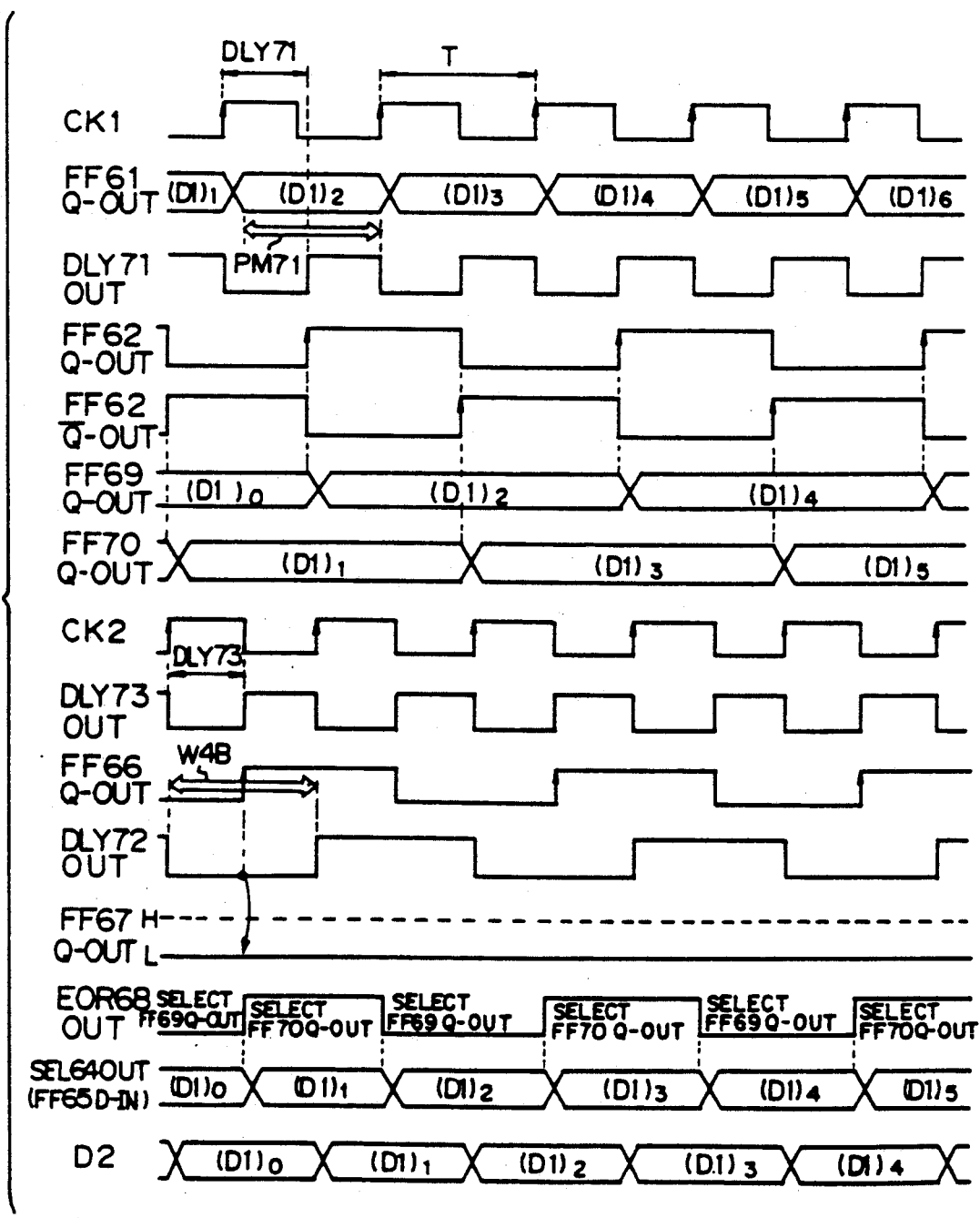

FIGS. 4A and 4B show the timings of an operation of the above construction of FIG. 3.

As shown in FIGS. 4A and 4B, the delay circuit 71 of the construction of FIG. 3 gives a predetermined constant delay DLY71 to the clock CK1 so that the D-type flip-flop circuits 69 and 70 can alternatively input each bit of the Q-output of the D-type flip-flop circuit 61 at the timing of a rising of the output of the delay circuit 71 under control of register control signals which is generated from the output of the delay circuit 71.

The edge-triggered operation for inputting the bit into the D-type flip-flop circuits 69 and 70 is carried out at a timing preferably as far as possible from the data changing points (or as near as possible the center of the duration between the adjacent data changing points) of the Q-output of the D-type flip-flop circuit 61. As a minimum requirement, the timing of the edge-triggered operation is required to be within the duration wherein the value of data is stable, as shown by PM71 in FIGS. 4A and 4B. Namely, the limitation of the variation in the delay time of the delay circuit 71 is relaxed compared with the limitation on the delay time DLY56 in the delay circuit 56 in the aforementioned construction of FIG. 1.

The phases of the Q-output and $\overline{Q}$-output of the D-type flip-flop circuit 62 are different from each other by 180°. Namely, the Q-output and $\overline{Q}$-output of the D-type flip-flop circuit 62 rise alternatively at each timing of a rising of the output of the delay circuit 71, and are each applied to the data input terminals of the D-type flip-flop circuits 69 and 70, respectively. Thus, when a series of bits of serial data $(D1)_0$, $(D1)_1$, $(D1)_2$, $(D1)_3$, ... $(D1)_{2m-1}$, $(D1)_{2m}$ are applied through the D-type flip-flop circuit 61 to both the D-type flip-flop circuits 69 and 70, the even-numbered bits $(D1)_0$, $(D1)_2$, ... $(D1)_{2m}$ are input into the D-type flip-flop circuit 69 at the timing of the risings of the Q-output of the D-type flip-flop circuit 62, and the odd-numbered bits $(D1)_1$, $(D1)_3$, ... $(D1)_{2m-1}$ are input into the D-type flip-flop circuit 70 at the timing of the risings of the Q-output of the D-type flip-flop circuit 62.

Therefore, the value of each bit of the input data is held in a corresponding register (D-type flip-flop circuit 69 or 70) for two cycles of the input data, i. e., for twice the cycle time of the input data. Since the extent of the vicinities of the data changing points wherein the value of data is instable is not varied by the above operation, the relative extent of the above instable durations in a cycle is reduced in the construction of FIG. 3 compared with the construction of FIG. 1.

The outputs of the D-type flip-flop circuits 69 and 70 are selected in the selector 64 under the control of the output of the exclusive OR circuit 68. The output of the exclusive OR circuit 68 is made by comparing the phases of the outputs of the delay circuit 72 and the frequency dividing circuit constructed by the D-type flip-flop circuit 66, at the D-type flip-flop circuit 67, and shifting the phase of the Q-output of the D-type flip-flop circuit 66 by 0° or 180° according to the comparison result, at the exclusive OR circuit 68.

The shifting operation is carried out so that each of the outputs of the D-type flip-flop circuits 69 and 70 is selected in the selector 64 at a duration as near as possible the center of the duration of a value in the output of the D-type flip-flop circuit.

For example, when the delay time DLY71 in the delay circuit 71 is about half cycle of the input signal with respect a modulus of the cycle time of the input signal, and the delay time DLY72 in the delay circuit 72 is about zero with respect a modulus of the cycle time of the input signal, as shown in FIGS. 4A and 4B, the possible range of the phase of the Q-output of the D-type flip-flop circuit 66 to obtain the low level Q-output of the D-type flip-flop circuit 67, and the possible range of the phase of the Q-output of the D-type flip-flop circuit 66 to obtain the high level Q-output of the D-type flip-flop circuit 67 are each shown by W4A and W4B in FIGS. 4A and 4B, respectively.

The Q-output of the D-type flip-flop circuit 66 is output and shifted by 180° (inverted) through the exclusive OR circuit 68 in the case of FIG. 4A, and the Q-output of the D-type flip-flop circuit 66 is output without being shifted through the exclusive OR circuit 68 in the case of FIG. 4B.

The phase of the output of the exclusive OR circuit 68 shown in FIGS. 4A and 4B is at the center of the above predetermined range. Generally, the phase of the output of the exclusive OR circuit 68 can vary in both sides of the center phase up to W4A/2 or W4B/2, according to the phase of the Q-output of the D-type flip-flop circuit 66. When the phase of the Q-output of the D-type flip-flop circuit 66 exceeds the above range in one of the cases of FIGS. 4A and 4B, the situation is converted to the other of the cases of FIGS. 4A and 4B so that the phase of the output of the exclusive OR circuit 68 is maintained within the predetermined range. The possible range of the phase of the Q-output of the D-type flip-flop circuit 66 to obtain the high level Q-output of the D-type flip-flop circuit 67, and the possible range of the phase of the Q-output of the D-type flip-flop circuit 66 to obtain the low level Q-output of the D-type flip-flop circuit 67, are each shown by W4A and W4B in FIGS. 4A and 4B, respectively.

Since the low level selector control signal makes the selector 64 select the Q-output of the D-type flip-flop circuit 69, and the high level selector control signal makes the selector 64 select the Q-output of the D-type flip-flop circuit 70 in the example shown in FIGS. 4A and 4B, the selector 64 outputs the series of the input data bits $(D1)_0$, $(D1)_1$, $(D1)_2$, $(D1)_3$, ... $(D1)_{2m-1}$, $(D1)_{2m}$ in the same order as the above-mentioned input series.

As shown for the data bit $(D1)_1$, $(D1)_2$, $(D1)_3$, and $(D1)_4$ in FIGS. 4A and 4B, the duration in which each of the data bits is selected by the selector 64, corresponds to the area near the center of the duration of the output of the data bit in the corresponding one of the D-type flip-flop circuits 69 and 70, where the length of each duration is twice the cycle time of the receiving clock CK1 and is twice the above duration of the selection of one data bit. Namely, the selected duration is apart from the data changing points of the output of the data bit in the corresponding one of the D-type flip-flop circuits 69 and 70. Therefore, the possibility of an occurrence of an error due to instability in the vicinities of the data changing points will be decreased.

In addition, in the example shown in FIGS. 4A and 4B, the delay time DLY73 in the delay circuit 73 is set to about half of the cycle time of the input data, therefore, timings of rising of the system clock CK2 are located almost in the center of the duration of the output of each bit. Namely, the timing of the edge-triggered operation is almost furthest from the data changing points of the output of the selector 64.

Although, generally, the phase (relative to the phase of the receiving clock CK1) of the Q-output of the D-type flip-flop circuit 66 varies with the phase of the system clock CK2, when the timing of a rising of the Q-output of the D-type flip-flop circuit 66 is near an end of the above-mentioned possible ranges W4A and W4B in either of FIGS. 4A or 4B, one end of the duration of each selection in the selector 64 includes a vicinity of a data changing point of a corresponding one of the output of the D-type flip-flop circuits 69 and 70. However, as the timing of a rising of the system clock CK2 is located almost in the center of the duration of the output of each bit by the above-mentioned setting of the delay time DLY73 in the example shown in FIGS. 4A or 4B, the timing of the edge-triggered operation at the D-type flip-flop circuit 65 is limited within the range further apart than a half the cycle of the input data from the data changing points of the duration of each data bit in either of the outputs of the D-type flip-flop circuits 69 and 70. This means there is a phase margin of half the cycle time of the input data in both sides of the above center of the duration, regarding the setting of the delay time DLY73 in the delay circuit 73.

The delay time DLY72 might also vary due to the variation in the geometries of the circuit arrangement and characteristics of circuit elements used in individual circuits, accordingly, the above-mentioned range of the variation in the phase of the output of exclusive OR circuit 68 varies, and when the phase of the output of the delay circuit 72 varies from the phase shown in FIGS. 4A and 4B, a data changing point of the output of the D-type flip-flop circuit 69 or 70 may appear in a duration of the output of the selector 64 corresponding to a duration of a value of the selector control signal.

In the above case, the position of the data changing point from an end of a duration of the output of the selector 64 is at most half the cycle time of the input data from an end of the duration of a selection of a value. In the aforementioned setting of the delay time DLY73 as shown in FIGS. 4A and 4B, the timing for the edge-triggered operation in the D-type flip-flop circuit 65 is set in the center of each duration of a value of the selector control signal, and the above center of a duration corresponds to half the cycle of the input data from an end of the duration.

Considering the above situation regarding the settings of the delay times DLY72 and DLY73, it is understood that one half the cycle time of the input data is given to the sum of variations of the above delay times DLY72 and DLY73 in the construction of FIG. 3. This is twice the phase margin allowed in the construction of FIG. 1 for the setting of the delay time DLY56 in the prior art.

Further, in the above-mentioned first embodiment of the present invention, all the timing signals are generated in the ½ frequency dividing circuits which are constructed by D-type flip-flop circuits by connecting their Q-output terminal with their own data input terminal, and therefore the duty factors of the timing signals in the following stages of the ½ frequency dividing circuits are exactly 50%. This is beneficial to an accurate operation of the construction of FIG. 3. For example, the cycle times of the renewal of the held data in the D-type flip-flop circuits 69 and 70 equal, and the durations of the selections of the Q-outputs of the D-type flip-flop circuits 69 and 70 equal.

Figure 5:
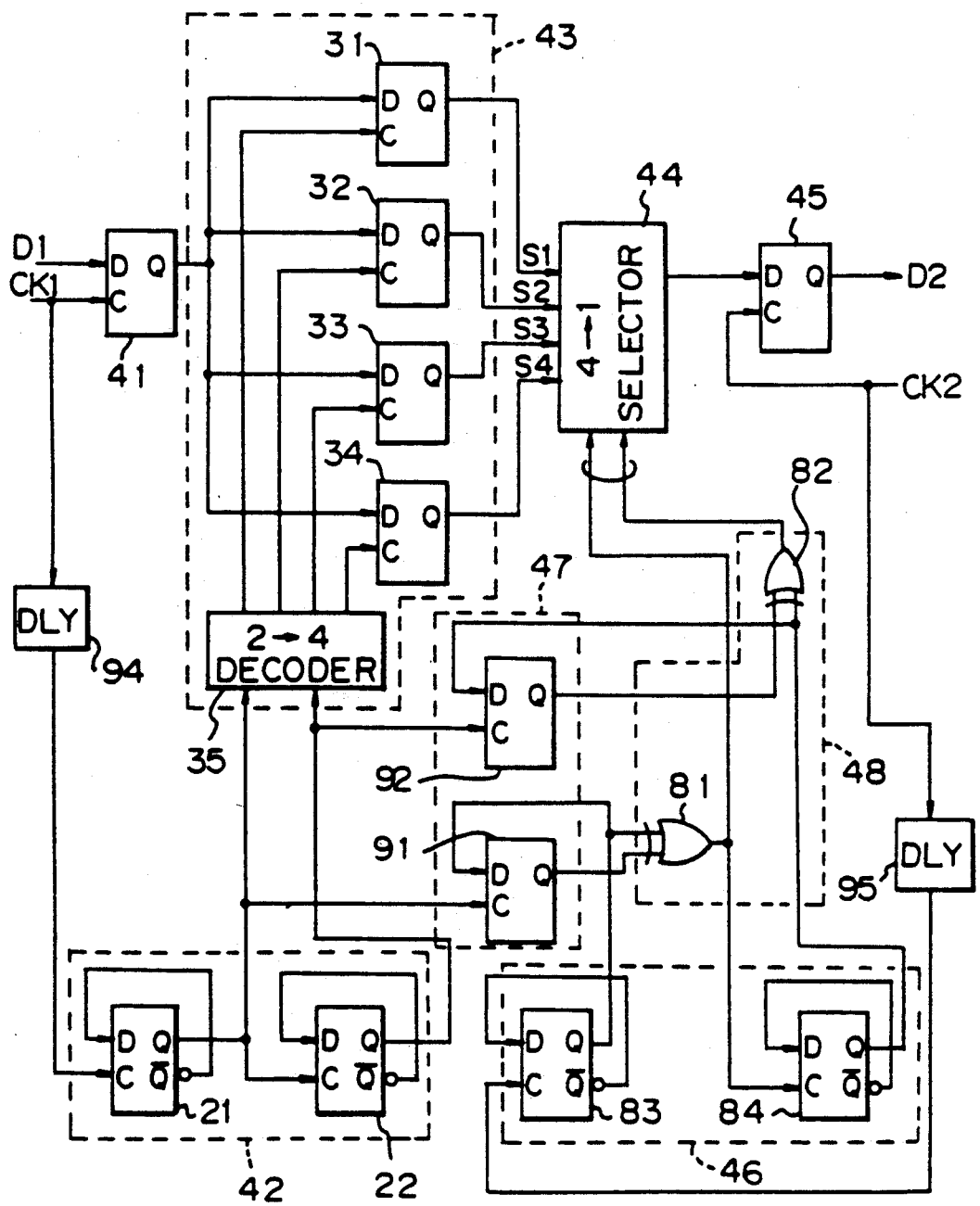
FIG. 5 shows a construction of the second embodiment of the present invention.

FIG. 5 shows a construction of the second embodiment of the present invention.

In FIG. 5, reference numerals 21, 22, 31, 32, 33, 34, 41, 42, 45, 83, and 84 each denote a D-type flip-flop circuit, 35 denotes a decoder, 44 denotes a selector, 81 and 82 each denotes an exclusive OR circuit, and 94 and 95 each denotes a delay circuit.

The D-type flip-flop circuit 41 in FIG. 5, which corresponds to the D-type flip-flop circuit 51 in FIG. 1 and the D-type flip-flop circuit 83 in FIG. 3, functions as an input buffer register, and the D-type flip-flop circuit 45 in FIG. 5, which corresponds to the D-type flip-flop circuit 52 in FIG. 1 and the D-type flip-flop circuit 65 in FIG. 3, functions as an output buffer register. Further, the D-type flip-flop circuit 91 and the exclusive OR circuit 81, or the D-type flip-flop circuit 92 and the exclusive OR circuit 82 in FIG. 5, functions as a phase comparator and a phase shifter in somewhat different manner from the similar constructions of the D-type flip-flop circuit 53 and the exclusive OR circuit 54 in FIG. 1 or the D-type flip-flop circuit 67 and the exclusive OR circuit 68 in FIG. 3, as explained below.

According to the present invention, the Q-output of the D-type flip-flop circuit 41 is input into one of the D-type flip-flop circuits 31 to 34 in a predetermined cyclic order. The D-type flip-flop circuits 31 to 34 constitute the aforementioned register means comprising a plurality of registers.

The timing of the inputs of the above data into the D-type flip-flop circuits 31 to 34 are given by a ¼ frequency dividing circuit 42 constructed by the D-type flip-flop circuits 21 and 22. The D-type flip-flop circuit 21 receives the receiving clock CK1 at the edge-triggered input terminal C through the delay circuit 94, and connects its own $\overline{Q}$-output terminal to its own data input terminal, i.e., the D-type flip-flop circuit 21 constitutes a ½ frequency dividing circuit by itself. The Q-output of the D-type flip-flop circuit 21 is applied to the edge-triggered input terminal C of the D-type flip-flop circuit 22. The D-type flip-flop circuit 22 connects its own $\overline{Q}$-output terminal to its own data input terminal, i.e., the D-type flip-flop circuit 22 constitutes a ½ frequency dividing circuit by itself. The Q-output of the D-type flip-flop circuit 21 and the Q-output of the D-type flip-flop circuit 22 are applied to the input terminals of the decoder 35. The decoder 35 has four output terminals, and the four terminals are each connected to the edge-triggered input terminals of the D-type flip-flop circuits 31 to 34, respectively. Each output of the decoder 35 functions as a register control signal to make a corresponding one of the D-type flip-flop circuits 31 to 34 renew its content by an applied value at the timing of the rising of the register control signal. The timings of the risings of the four outputs of the decoder 35 (the register control signals) are such that the above renewing operations are carried out in the above-mentioned predetermined cyclic order, as explained later with reference to the drawings.

On the other hand, the system clock CK2 is delayed through the delay circuit 95, and is then applied to a modified ¼ frequency dividing circuit 46 constructed by the D-type flip-flop circuits 83 and 84. The D-type flip-flop circuit 83 receives the receiving clock CK2 at the edge-triggered input terminal C through the delay circuit 95, and connects its own $\overline{Q}$-output terminal to its own data input terminal, i.e., the D-type flip-flop circuit 83 constitutes a ½ frequency dividing circuit by itself. The Q-output of the D-type flip-flop circuit 83 is applied to one of input terminals of the exclusive OR circuit 81 and the data input terminal of the D-type flip-flop circuit 91. The D-type flip-flop circuit 91 receives the Q-output of the D-type flip-flop circuit 21 at its edge-triggered input terminal C, and the Q-output of the D-type flip-flop circuit 91 is applied to the other input terminal of the exclusive OR circuit 81. The output of the exclusive OR circuit 81 is applied to the edge-triggered input terminal C of the D-type flip-flop circuit 84.

The D-type flip-flop circuit 84 connects its own $\overline{Q}$-output terminal to its own data input terminal, i.e., the D-type flip-flop circuit 84 constitutes a ½ frequency dividing circuit by itself. The Q-output of the D-type flip-flop circuit 84 is applied to one of input terminals of the exclusive OR circuit 82 and the data input terminal of the D-type flip-flop circuit 92. The D-type flip-flop circuit 92 receives the Q-output of the D-type flip-flop circuit 22, and the Q-output of the D-type flip-flop circuit 92 is applied to the other input terminal of the exclusive OR circuit 82. The outputs of the exclusive OR circuits 81 and 82 are supplied to the control input terminals of the selector 44.

The above D-type flip-flop circuit 91 compares the phase of the Q-output of the D-type flip-flop circuits 21 and 83, and the exclusive OR circuit 81 shifts the phase of the Q-output of the D-type flip-flop circuit 83 by 0° or 180° according to the comparison result obtained as the Q-output of the D-type flip-flop circuit 91. Similarly, the above D-type flip-flop circuit 92 compares the phase of the Q-output of the D-type flip-flop circuits 22 and 84, and the exclusive OR circuit 82 shifts the phase of the Q-output of the D-type flip-flop circuit 84 by 0° or 180° according to the comparison result obtained as the Q-output of the D-type flip-flop circuit 92.

The selector 44 receives the Q-outputs of the D-type flip-flop circuits 31 to 34 at its corresponding input terminals, and selects one of the Q-outputs under the control of the selector control signal. The control is such that the Q-outputs of the D-type flip-flop circuits 31 to 34 are selected in the aforementioned predetermined cyclic order in which order the data bits held in the D-type flip-flop circuits 31 to 34 have been input into the D-type flip-flop circuits 31 to 34, as explained later with reference to the drawings.

Figures 2, 6A:
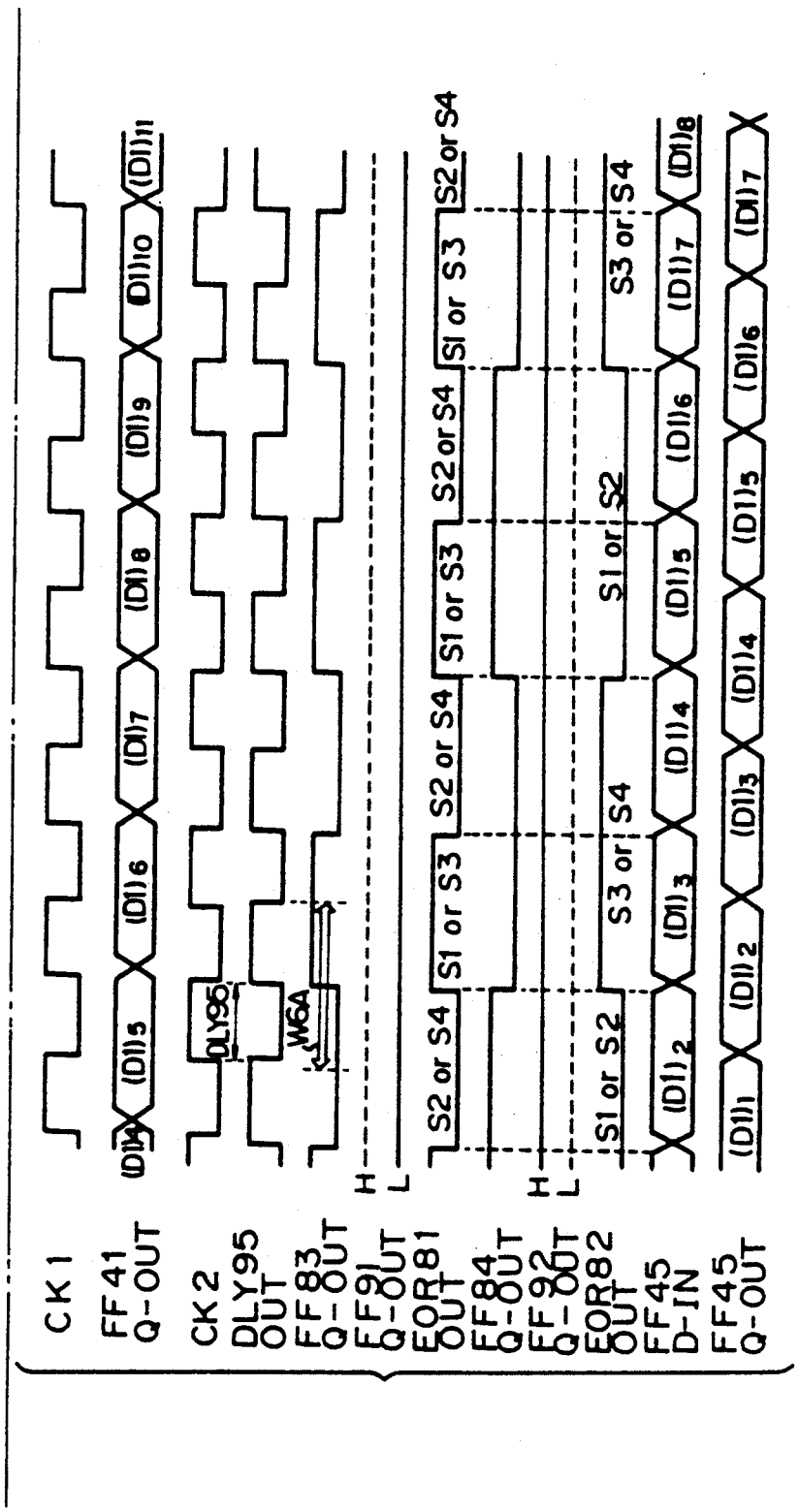
Figures 2, 6B:
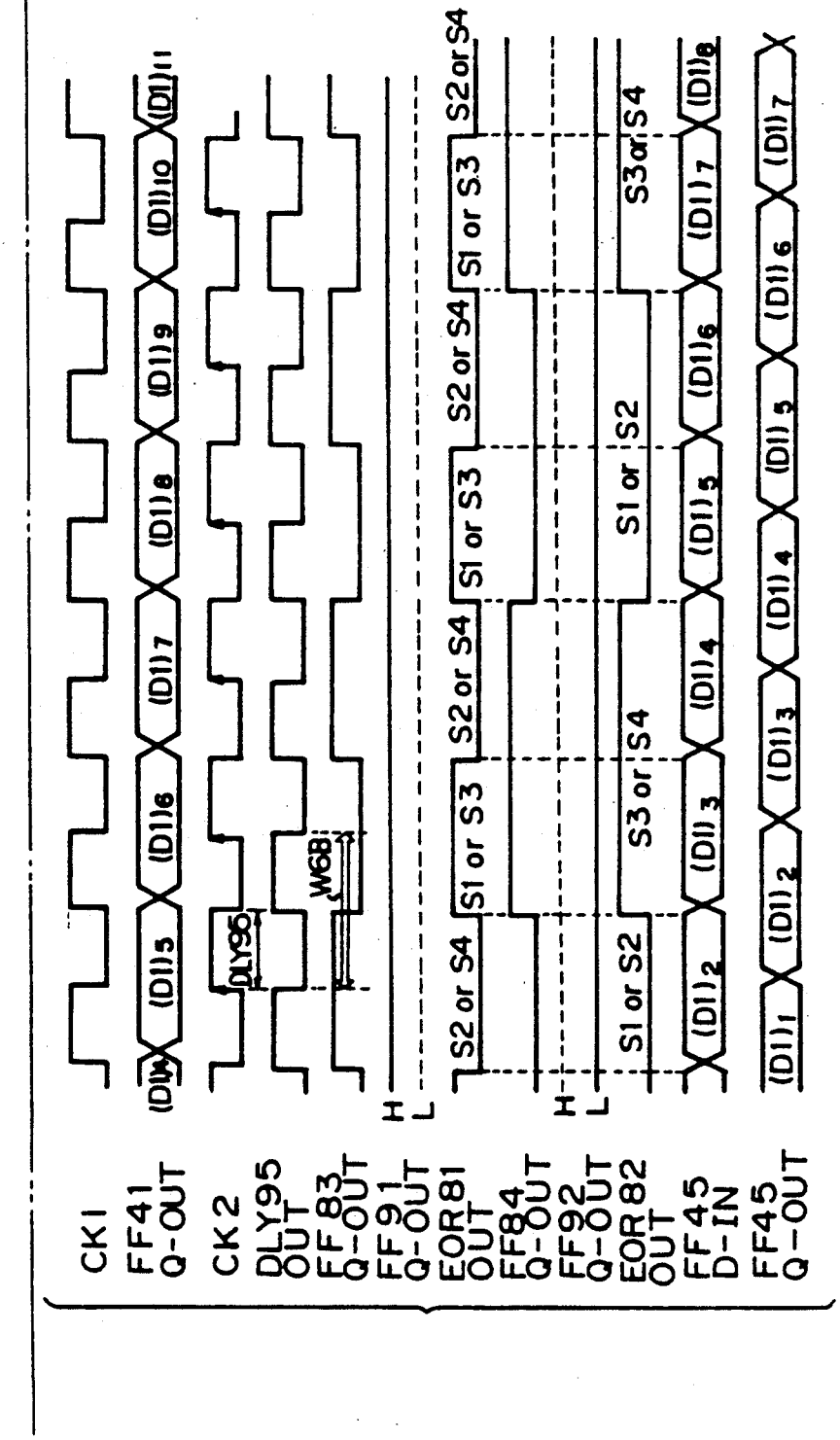

FIGS. 6A and 6B show the timings of an operation of the above construction of FIG. 5.

As shown in FIGS. 6A and 6B, and similar to the construction of FIG. 3, the delay circuit 94 of the construction of FIG. 5 gives a predetermined constant delay DLY94 to the clock CK1 so that the D-type flip-flop circuits 31 to 34 can cyclically input each bit of the Q-output of the D-type flip-flop circuit 41 at the timing of a rising of the output of the delay circuit 94, and an edge-triggered operation for inputting the bit is carried out at a timing preferably as far as possible from the data changing points of the Q-output of the D-type flip-flop circuit 41. As a minimum requirement, the timing of the edge-triggered operation is required to be within the duration wherein the value of data is stable as shown by PM94 in FIGS. 6A and 6B. Thus, the same limitation on the variation in the delay time of the delay circuit 94 as the limitation for the delay circuit 71 in the construction of FIG. 3 is obtained, and the limitation is relaxed compared with the aforementioned construction of FIG. 1.

The phases of the Q-output and $\overline{Q}$-output in each of the D-type flip-flop circuits are different from each other by 180°, the cycle time of the outputs of the D-type flip-flop circuit 21 is twice the cycle time of the receiving clock CK1, and the cycle time of the outputs of the D-type flip-flop circuit 22 is twice the cycle time of the above outputs of the D-type flip-flop circuit 21, i.e., four times the cycle time of the receiving clock CK1. Namely, the Q-output and $\overline{Q}$-output of the D-type flip-flop circuit 21 rise alternatively at each timing of a rising of the output of the delay circuit 94, and the Q-output and $\overline{Q}$-output of the D-type flip-flop circuit 21 rise alternatively at each timing of a rising of the Q-output (or $\overline{Q}$-output) of the D-type flip-flop circuit 21.

The Q-outputs and $\overline{Q}$-outputs of the D-type flip-flop circuits 21 and 22, are applied to the input terminals of the decoder 35. The four outputs of the decoder 35 corresponding to the outputs of the D-type flip-flop circuits 21 and 22, are each applied to the edge-triggered input terminals of a corresponding one the D-type flip-flop circuits 31 to 34 as the register control signals, respectively. The phase of each of the four signals is different from the phase of the adjacent signals by a time equal to the cycle time of the receiving clock CK1, and the four signals control the D-type flip-flop circuits 31 to 34 to renew the content at the predetermined order.

When a series of bits of serial data $(D1)_0$, $(D1)_1$, $(D1)_2$, $(D1)_3$, ... $(D1)_{4m}$, $(D1)_{4m+1}$, $(D1)_{4m+2}$, $(D1)_{4m+3}$, are input through the D-type flip-flop circuit 41, the bits $(D1)_0$, $(D1)_4$, ... $(D1)_{4m}$ are input into the data input terminal of the D-type flip-flop circuit 31 at the timing of a rising of the edge-triggered input of the D-type flip-flop circuit 31, the bits $(D1)_1$, $(D1)_5$, ... $(D1)_{4m+1}$ are input into the data input terminal of the D-type flip-flop circuit 32 at the timing of the risings of the edge-triggered input of the D-type flip-flop circuit 32, the bits $(D1)_2$, $(D1)_6$, ... $(D1)_{4m+2}$ are input into the data input terminal of the D-type flip-flop circuit 33 at the timing of the risings of the edge-triggered input of the D-type flip-flop circuit 33, and the odd-numbered bits $(D1)_3$, $(D1)_7$, ... $(D1)_{4m+3}$ are input into the data input terminal of the D-type flip-flop circuit 34 at the timing of the risings of the $\overline{Q}$-output of the D-type flip-flop circuit 34.

The value of each bit of the input data is held in a corresponding register (one of the D-type flip-flop circuits 31 to 34) for four cycles of the input data, i.e., for four times the cycle time of the receiving clock CK1. Since the extent of the vicinities of the data changing points wherein the value of data is instable is not varied by the above operation, the relative extent of the above instable durations in a cycle is reduced in the construction of FIG. 5 compared with the construction of FIG. 3 or with the construction of FIG. 1.

The outputs of the D-type flip-flop circuits 31 to 34 are selected in the selector 44 under the control of the output of the exclusive OR circuits 81 and 82. The output of the exclusive OR circuit 81 is made by comparing the phases of the Q-output of the D-type flip-flop circuit 21 and the Q-output of the D-type flip-flop circuit 83, at the D-type flip-flop circuit 91, and shifting the phase of the Q-output of the D-type flip-flop circuit 83 by 0° or 180° according to the comparison result, at the exclusive OR circuit 91.

For example, when the delay time DLY94 in the delay circuit 94 is about half cycle of the input signal with respect a modulus of the cycle time of the input signal, as shown in FIGS. 6A and 6B, the possible range of the phase of the Q-output of the D-type flip-flop circuit 83 to obtain the low level Q-output of the D-type flip-flop circuit 91, and the possible range of the phase of the Q-output of the D-type flip-flop circuit 83 to obtain the high level Q-output of the D-type flip-flop circuit 91 are each shown by W6A and W6B in FIGS. 6A and 6B, respectively.

The Q-output of the D-type flip-flop circuit 83 is phase shifted by 180° (inverted) through the exclusive OR circuit 81 in the case of FIG. 6B, and the Q-output of the D-type flip-flop circuit 83 is not phase shifted through the exclusive OR circuit 81 in the case of FIG. 6A. As shown in FIGS. 6A and 6B, the low level output of the exclusive OR circuit 81 makes the selector 44 select the Q-outputs of the D-type flip-flop circuits 32 or 34 (the Q-outputs of the D-type flip-flop circuits 32 and 34, which are each denoted by S2 and S4 in FIG. 5), and the high level output of the exclusive OR circuit 81 makes the selector 44 select the Q-output of the D-type flip-flop circuit 31 or 33 (the Q-outputs of the D-type flip-flop circuits 31 and 33, which are each denoted by S1 and S3 in FIG. 5) in the example shown in FIGS. 6A and 6B.

The output of the exclusive OR circuit 81 is further applied to the edge-triggered input terminal of the D-type flip-flop circuit 84, which constitutes a ½ frequency dividing circuit, and the phase of the Q-output of the D-type flip-flop circuit 84 is compared with the phase of the Q-output of the D-type flip-flop circuit 22 at the D-type flip-flop circuit 92. Then, the Q-output of the D-type flip-flop circuit 84 is phase shifted by 180° (inverted) through the exclusive OR circuit 82 in the case of FIG. 6A, and the Q-output of the D-type flip-flop circuit 84 is not phase shifted through the exclusive OR circuit 82 in the case of FIG. 6B. As shown in FIGS. 6A and 6B, the low level output of the exclusive OR circuit 82 makes the selector 44 select the Q-outputs of the D-type flip-flop circuits 31 or 32 (the Q-outputs of the D-type flip-flop circuits 31 and 32, which are each denoted by S1 and S2 in FIG. 5), and the high level output of the exclusive OR circuit 82 makes the selector 44 select the Q-output of the D-type flip-flop circuit 33 or 34 (the Q-outputs of the D-type flip-flop circuits 33 and 34, which are each denoted by S3 and S4 in FIG. 5) in the example shown in FIGS. 6A and 6B.

Under the control of the above outputs of the exclusive OR circuits 81 and 82, the selector 44 outputs the series of the input data bits $(D1)_0$, $(D1)_1$, $(D1)_2$, $(D1)_3$, ... $(D1)_{4m}$, $(D1)_{4m+1}$, $(D1)_{4m+2}$, $(D1)_{4m+3}$ in the same order as the above-mentioned input series, as shown in FIGS. 6A and 6B.

As shown for the data bit $(D1)_3$, $(D1)_4$, $(D1)_5$, and $(D1)_6$ in FIGS. 6A and 6B, the duration in which each of the data bits is selected by the selector 44, corresponds to the area near the center of the duration of the output of the data bit in the corresponding one of the D-type flip-flop circuits 31 to 34 having a length four times the receiving clock CK1 and the above duration of the selection of one data bit. Namely, the selected duration is far from the data changing points of the output of the data bit in the corresponding one of the D-type flip-flop circuits 31 to 34. Therefore, the possibility of an occurrence of an error due to instability in the vicinities of the data changing points will be decreased.

Generally, the phase (relative to the phase of the receiving clock CK1) of the Q-output of the D-type flip-flop circuit 83 varies with the phase of the system clock CK2, and accordingly, the phase of each selection varies. However, as mentioned before, the range of the variation in the phase of the Q-output of the D-type flip-flop circuit 83 is limited within the width W6A or W6B shown in FIGS. 6A and 6B. Therefore, the variation in the phase of the Q-output of the D-type flip-flop circuit 83, and accordingly, the variation in the phase of the selection in the selector 44 is at most half the cycle time of the receiving clock CK1. Namely, even when the phase of the selection in the selector 44 is varies at most, the duration of the selection is still far from the data changing points of the output of the corresponding one of the D-type flip-flop circuits 31 to 34.

In addition, in the example shown in FIGS. 6A and 6B, the delay time DLY95 in the delay circuit 95 is set to about half of the cycle time of the input data (the receiving clock CK1), therefore, timings of rising of the system clock CK2 are located almost in the center of the duration of the output of each bit. Namely, the timing of the edge-triggered operation is almost furthest from the data changing points of the output of the selector 44. In this sense, there is a phase margin of half the cycle time of the input data in both sides of the above center of the duration, regarding the setting of the delay time DLY95 in the delay circuit 95.

Explained above are the embodiments of the present invention wherein two or four registers are included in the register means, using ½ frequency dividing circuits outputting timing signals having duty factors of 50%.

It is readily understood that similar constructions having a number $2^n$ of registers, where n is a natural number (positive integer), and wherein the selector control signal generating means and the register control signal generating means each consist of the number n of stages, and each of the stages comprises a ½ frequency dividing circuit, can be constructed retaining the benefit of the timing signals having duty factors of 50%.

In a first possible mode of the above construction, the number n of ½ frequency dividing circuits in the register control signal generating means constitutes a ½$^n$ frequency dividing circuit, and the selector control signal generating means further comprises the number n of phase shifting means, where each of the phase shifting means compares the phase of the output of one of the ½ frequency dividing circuits in the register control signal generating means with the phase of the output of a corresponding one of the ½ frequency dividing circuits in the corresponding stage of the selector control signal generating means, shifts the phases of the output of each of the ½ frequency dividing circuits in the register control signal generating means according to the result of the comparison, and supplies the phase-shifted signals to the selecting means to control the selecting means.

In second mode of the above construction, similar to the above first mode, the number n of ½ frequency dividing circuits in the register control signal generating means constitutes a ½$^n$ frequency dividing circuit, and the selector control signal generating means further comprises the number n of phase shifting means, where each of the phase shifting means compares the phase of the output of one of the ½ frequency dividing circuits in the register control signal generating means with the phase of the output of a corresponding one of the ½ frequency dividing circuits in the corresponding stage of the selector control signal generating means. However, in the second mode, the phase shifting means further shifts the phases of the output of each of the ½ frequency dividing circuits in the selector control signal generating means according to the result of the comparison, and supplies the phase-shifted signals to the selecting means to control the selecting means.

In the above first mode, each of the number n of phase shifting means can be realized using: a D-type flip-flop circuit which receives the output of one of the ½ frequency dividing circuits in the register control signal generating means at its edge-trigger input terminal and the output of one of the ½ frequency dividing circuits in a corresponding stage of the selector control signal generating means at its data input terminal, and an exclusive OR gate which receives the output of one of the ½ frequency dividing circuits in the register control signal generating means and the output of the D-type flip-flop circuit to output one bit of the selector control signal.

In another approach, each of the number n of phase shifting means in the above first mode, can be realized using: a D-type flip-flop circuit which receives the output of one of the ½ frequency dividing circuits in the register control signal generating means at its data input terminal and the output of one of the ½ frequency dividing circuits in a corresponding stage of the selector control signal generating means at its edge-trigger input terminal, and an exclusive OR gate which receives the output of one of the ½ frequency dividing circuits in the register control signal generating means and the output of the D-type flip-flop circuit to output one bit of the selector control signal.

Similarly, in the above second mode, each of the number n of phase shifting means can be realized using: a D-type flip-flop circuit which receives the output of one of the ½ frequency dividing circuits in the register control signal generating means at its edge-trigger input terminal and the output of one of the ½ frequency dividing circuits in a corresponding stage of the selector control signal generating means at its data input terminal, and an exclusive OR gate which receives the output of the ½ frequency dividing circuit in the corresponding stage of the selector control signal generating means and the output of the D-type flip-flop circuit to output one bit of the selector control signal.

In still another approach, each of the number n of phase shifting means in the above second mode, can be realized using: a D-type flip-flop circuit which receives the output of one of the ½ frequency dividing circuits in the register control signal generating means at its data input terminal and the output of one of the ½ frequency dividing circuits in a corresponding stage of the selector control signal generating means at its edge-trigger input terminal, and an exclusive OR gate which receives the output of the ½ frequency dividing circuit in the corresponding stage of the selector control signal generating means and the output of the D-type flip-flop circuit to output one bit of the selector control signal.

Further, the number of the registers in the register means in the present invention may be other than the number represented by $2^n$.

Since the frequency dividing circuits which divides the frequency of the input signal by the number m other than the number represented by $2^n$ is well known, the register control signal generating means in the present invention in a third mode, can be constructed using: a 1/m frequency dividing circuit which divides the frequency of the system clock by the predetermined number m to generate a set of the predetermined number m of first frequency-divided signals each of which has a cycle time equal to the predetermined number m times of the cycle time of the receiving clock, where the phases of each of the first frequency-divided signals is different from adjacent first frequency-divided signals by the cycle time of the receiving clock and the phase relationship between each of the first frequency-divided signals corresponds to the predetermined cyclic order; and another 1/m frequency dividing circuit which divides the frequency of the system clock by the predetermined number m to generate the predetermined number m of second frequency-divided signals, each having a cycle time equal to the predetermined number m times of the cycle time of the system clock, where the phase of each of the second frequency-divided signals is different from adjacent second frequency-divided signals by the cycle time of the system clock and the phase relationship between each of the second frequency-divided signals corresponds to the predetermined cyclic order.

In addition, the phase shift means in the above construction shifts phases of the above second frequency-divided signals according to a phase relationship between phases of the system clock and the receiving clock so that each of the outputs of the registers is selected in the selecting means at a duration as near as possible the center of the duration of the output of the register, and is input in the data outputting means at a timing as near as possible the center of the duration of the output of the selecting means, and the phase relationship between phases of the system clock and the receiving clock is detected by comparing the phases of one or more of the register control signals with the phases of corresponding one or more of the second frequency-divided signals. Since there is the aforementioned phase relationships between the first frequency-divided signals and between the second frequency-divided signals, where each of the phase relationships corresponds to the above predetermined cyclic order, the above-mentioned phase relationship between phases of the system clock and the receiving clock may be obtained by comparing the phase of one or more representative samples of the register control signals with the phases of corresponding one or more of the second frequency-divided signals.

The selector control signal generating means can be realized in the following four ways.

In the first way, the selector control signal generating means can be realized by comprising for the above one or more representative samples of the second frequency-divided signals: a D-type flip-flop circuit and an exclusive OR circuit (or an exclusive NOR circuit) for each of the second frequency-divided signals, wherein the D-type flip-flop circuit receives the second frequency-divided signal at its data input terminal and a corresponding one of the predetermined number of first frequency-divided signals at its edge-trigger input terminal; and the exclusive OR gate receives the second frequency-divided signal and the output of the D-type flip-flop circuit to output one bit of the selector control signal.

In the second way, the selector control signal generating means can be realized by comprising for the above one or more representative samples of the second frequency-divided signals: a D-type flip-flop circuit and an exclusive OR circuit (or an exclusive NOR circuit) for each of the second frequency-divided signals, wherein the D-type flip-flop circuit receives the second frequency-divided signal at its edge-trigger input terminal and a corresponding one of the predetermined number of first frequency-divided signals at its data input terminal; and the exclusive OR gate receives the second frequency-divided signal and the output of the D-type flip-flop circuit to output one bit of the selector control signal.

In the third way, the selector control signal generating means can be realized by comprising for the above one or more representative samples of the second frequency-divided signals: a D-type flip-flop circuit which receives the second frequency-divided signal at its data input terminal and a corresponding one of the predetermined number of first frequency-divided signals at its edge-trigger input terminal; and the exclusive OR gate receives the second frequency-divided signal and the output of the D-type flip-flop circuit to output one bit of the selector control signal.

In the fourth way, the selector control signal generating means can be realized by comprising for the above one or more representative samples of the second frequency-divided signals: a D-type flip-flop circuit which receives the second frequency-divided signal at its edge-trigger input terminal and a corresponding one of the predetermined number of first frequency-divided signals at its data input terminal; the exclusive OR gate receives the second frequency-divided signal and the output of the D-type flip-flop circuit to output one bit of the selector control signal.

We claim:

1. A phase adjusting circuit for adjusting a phase of each bit of serial data by synchronizing with a system clock, comprising:

register means including n one-bit registers, each of which inputs every n-bit of serial data, synchronized with a receiving clock which is extracted from the serial data so that respective bits of said serial data input to said registers in a predetermined cyclic order, where n is an integer and each of said registers holds and outputs each bit which is input therein, for a duration which is equal to n times the cycle time of said receiving clock;

selector control signal generating means for detecting a phase relationship between phases of said system clock and said receiving clock, and generating, based on said phase relationship, a selector control signal indicating one of said registers has an output to be selected, and a duration for which the selected output is stable by a phase thereof;

selecting means for selecting one of said outputs of said registers in said cyclic order of the inputs into said registers, under the control of said selector control signal; and data outputting means for receiving an output of said selecting means, and serially outputting the receiving outputs, synchronized with said system clock.

2. A phase adjusting circuit according to claim 1, wherein said selector control signal generating means determines the phase of said selector control signal so that each of the outputs of said registers is selected in said selecting means at a duration as near as possible to the center of the duration of the output of said registers.

3. A phase adjusting circuit according to claim 2, wherein said selector control signal generating means further determines the phase of said selector control signal so that the timing of said output in said outputting means is as near as possible to the center of the duration of the output of said selecting means.

4. A phase adjusting circuit according to claim 3, wherein said register means comprises a register control signal generating means for generating a group of register control signals, each of the register control signals having a cycle time equal to a predetermined number times the cycle time of said receiving clock, the phase of each of the register control signals is different from adjacent register control signals by the cycle time of said receiving clock, the phase relationship of the register control signals corresponding to said predetermined cyclic order, and each of the register control signals makes a corresponding one of said registers receive new data at each timing determined by the register control signals.

5. A phase adjusting circuit according to claim 4, wherein said register control signal generating means comprises first frequency dividing means for dividing the frequency of said system clock by said predetermined number to generate a set of said predetermined number of first frequency-divided signals each of which has a cycle time equal to said predetermined number times the cycle time of said receiving clock, where the phases of each of said first frequency-divided signals is different from adjacent first frequency-divided signals by the cycle time of said receiving clock and the phase relationship between each of said first frequency-divided signals corresponds to said predetermined cyclic order.

6. A phase adjusting circuit according to claim 5, wherein said selector control signal generating means comprises:
second frequency dividing means for dividing the frequency of said system clock by said predetermined number to generate said predetermined number of second frequency-divided signals each having a cycle time equal to said predetermined number times the cycle time of said system clock, where the phase of each of said second frequency-divided signals is different from adjacent second frequency-divided signals by the cycle time of said system clock and the phase relationship between each of said second frequency-divided signals corresponds to said predetermined cyclic order; and
phase shift means for shifting phases of the output of said second frequency dividing means according to said phase relationship between phases of said system clock and said receiving clock so that each of the outputs of said registers is selected in said selecting means at a duration as near as possible the center of the duration of the output of the register, and is input in said data outputting means at a timing as near as possible to the center of the duration of the output of said selecting means.

7. A phase adjusting circuit according to claim 6, wherein said phase relationship between phases of said system clock and said receiving clock is detected by a comparator for comparing the phases of one or more of said register control signals with the phases of corresponding ones of said second frequency-divided signals.

8. A phase adjusting circuit according to claim 7, wherein said selector control signal generating means for each of said predetermined number of second frequency-divided signals, comprises:
a D-type flip-flop circuit which receives the second frequency-divided signal at its data input terminal and a corresponding one of said predetermined number of first frequency-divided signals at its edge-trigger input terminal; and
an exclusive OR gate which receives the second frequency-divided signal and the output of said D-type flip-flop circuit to output one bit of said selector control signal.

9. A phase adjusting circuit according to claim 7, wherein said selector control signal generating means for each of said predetermined number of second frequency-divided signals, comprises:
a D-type flip-flop circuit which receives the second frequency-divided signal at its edge-trigger input terminal and a corresponding one of said predetermined number of first frequency-divided signals at its data input terminal; and
an exclusive OR gate which receives the second frequency-divided signal and the output of said D-type flip-flop circuit to output one bit of said selector control signal.

10. A phase adjusting circuit according to claim 7, wherein said selector control signal generating means for one or more representative samples of said second frequency-divided signals, comprises:
a D-type flip-flop circuit which receives the second frequency-divided signal at its data input terminal and a corresponding one of said predetermined number of first frequency-divided signals at its edge-trigger input terminal; and
an exclusive OR gate which receives the second frequency-divided signal and the output of said D-type flip-flop circuit to output one bit of said selector control signal.

11. A phase adjusting circuit according to claim 7, wherein said selector control signal generating means for one or more representative samples of said second frequency-divided signals, comprises:
a D-type flip-flop circuit which receives the second frequency-divided signal at its edge-trigger input terminal and a corresponding one of said predetermined number of first frequency-divided signals at its data input terminal; and
an exclusive OR gate which receives the second frequency-divided signal and the output of said D-type flip-flop circuit to output one bit of said selector control signal.

12. A phase adjusting circuit according to claim 7, wherein:
said predetermined number is equal to $2^n$, where n is a natural number (positive integer);
said selector control signal generating means and said register control signal generating means each are formed of said n number of stages, and each of said stages comprises a $\frac{1}{2}$ frequency dividing circuit;
said n number of $\frac{1}{2}$ frequency dividing circuits in said register control signal generating means forms a $\frac{1}{2}^n$ frequency dividing circuit; and
said selector control signal generating means further comprises said n number of said phase shifting means each for comparing the phase of the output of one of said $\frac{1}{2}$ frequency dividing circuits in said register control signal generating means with the phase of the output of a corresponding one of said $\frac{1}{2}$ frequency dividing circuits in the corresponding stage of said selector control signal generating means, shifting the phases of the output of each of said $\frac{1}{2}$ frequency dividing circuits in said register control signal generating means according to the result of said comparator, and supplying the phase-shifted signals to said selecting means to control said selecting means.

13. A phase adjusting circuit according to claim 12, wherein each of said n number of phase shifting means comprises:
- a D-type flip-flop circuit which receives the output of one of said ½ frequency dividing circuits in said register control signal generating means at its edge-trigger input terminal and the output of one of said ½ frequency dividing circuits in a corresponding stage of said selector control signal generating means at its data input terminal; and
- an exclusive OR gate which receives the output of one of said ½ frequency dividing circuits in said register control signal generating means and the output of said D-type flip-flop circuit to output one bit of said selector control signal.

14. A phase adjusting circuit according to claim 12, wherein each of said n number of phase shifting means comprises:
- a D-type flip-flop circuit which receives the output of one of said ½ frequency dividing circuits in said register control signal generating means at its data input terminal and the output of one of said ½ frequency dividing circuits in a corresponding stage of said selector control signal generating means at its edge-trigger input terminal; and
- an exclusive OR gate which receives the output of one of said ½ frequency dividing circuits in said register control signal generating means and the output of said D-type flip-flop circuit to output one bit of said selector control signal.

15. A phase adjusting circuit according to claim 7, wherein:
- said predetermined number is equal to $2^n$, where n is a natural number (positive integer);
- said selector control signal generating means and said register control signal generating means each comprise said n number of stages, and each of said stages comprises a ½ frequency dividing circuit;
- said n number of ½ frequency dividing circuits in said register control signal generating means forming a $\frac{1}{2^n}$ frequency dividing circuit; and
- said selector control signal generating means further comprises said n number of phase shifting means each for comparing the phase of the output of one of said ½ frequency dividing circuits in said register control signal generating means with the phase of the output of one of said ½ frequency dividing circuits in a corresponding stage of said selector control signal generating means, shifting the phases of the output of each of said ½ frequency dividing circuits in said selector control signal generating means according to the result of said comparator, and supplying the phase-shifted signals to said selecting means to control said selecting means.

16. A phase adjusting circuit according to claim 15, wherein each of said n number of phase shifting means comprises:
- a D-type flip-flop circuit which receives the output of one of said ½ frequency dividing circuits in said register control signal generating means at its edge-trigger input terminal and the output of one of said ½ frequency dividing circuits in a corresponding stage of said selector control signal generating means at its data input terminal; and
- an exclusive OR gate which receives the output of the ½ frequency dividing circuit in the corresponding stage of said selector control signal generating means and the output of said D-type flip-flop circuit to output one bit of said selector control signal.

17. A phase adjusting circuit according to claim 15, wherein each of said n number of phase shifting means comprises:
- a D-type flip-flop circuit which receives the output of one of said ½ frequency dividing circuits in said register control signal generating means at its data input terminal and the output of one of said ½ frequency dividing circuits in a corresponding stage of said selector control signal generating means at its edge-trigger input terminal; and
- an exclusive OR gate which receives the output of the ½ frequency dividing circuit in the corresponding stage of said selector control signal generating means and the output of said D-type flip-flop circuit to output one bit of said selector control signal.

* * * * *